US012358759B1

(12) United States Patent
Martins et al.

(10) Patent No.: US 12,358,759 B1
(45) Date of Patent: Jul. 15, 2025

(54) ELEVATOR CAR CEILING ACCESS SYSTEM

(71) Applicant: Otis Elevator Company, Farmington, CT (US)

(72) Inventors: Antonio Martins, Vernon, CT (US); Yingxin Gao, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/790,071

(22) Filed: Jul. 31, 2024

(51) Int. Cl.
*B66B 11/02* (2006.01)

(52) U.S. Cl.
CPC ................................ *B66B 11/0246* (2013.01)

(58) Field of Classification Search
CPC .......................... B66B 11/0246; B66B 5/0087
See application file for complete search history.

(56) References Cited

U.S. PATENT DOCUMENTS 7,416,055 B2 * 8/2008 Penn ...................... B66B 11/06 182/144
10,227,213 B2 * 3/2019 Fauconnet .......... B66B 11/0226
11,358,837 B2 * 6/2022 Rocher ................... B66B 13/02
2006/0289244 A1 * 12/2006 Sittler ................. B66B 11/0246 187/401
2007/0056809 A1 * 3/2007 Fernandes ........... B66B 11/0246 187/401
2007/0056810 A1 * 3/2007 Fernandes ................. B66B 5/00 187/401
2013/0118839 A1 * 5/2013 Penn ......................... E04G 3/30 187/262
2019/0300338 A1 * 10/2019 Rocher ................... B66B 13/02
2019/0389698 A1 * 12/2019 Jimenez-Gonzalez ...................... B66B 11/0246
2021/0155458 A1 * 5/2021 Montigny ........... B66B 11/0246

FOREIGN PATENT DOCUMENTS

EP 3530603 A1 8/2019
EP 3546412 A1 10/2019
EP 3702309 A1 9/2020
EP 3760564 A1 1/2021
EP 3587333 B1 8/2021
EP 3943432 A1 1/2022
EP 3828119 B1 3/2023

* cited by examiner

*Primary Examiner* — Michael A Riegelman
(74) *Attorney, Agent, or Firm* — CANTOR COLBURN LLP

(57) ABSTRACT

An elevator car includes an elevator car floor, a plurality of side walls, and a ceiling defining an interior of the elevator car. A ceiling panel access system includes a drum sheave arranged within one of the side walls, at least one locking pin arranged on a top of the elevator car and configured to releasably engage with a ceiling access panel to lock the ceiling access panel in a locked state and disengage therefrom to cause the ceiling access panel to open into the interior of the elevator car, and at least one cable operably connecting the drum sheave to the at least one locking pin, wherein rotation of the drum sheave causes the at least one cable to wind about the drum sheave and cause retraction of the at least one locking pin from engagement with the ceiling access panel.

20 Claims, 6 Drawing Sheets

ELEVATOR CAR CEILING ACCESS SYSTEM

BACKGROUND

The subject matter disclosed herein generally relates to elevator systems and, more particularly, to elevator access systems and in particular to elevator car ceiling access systems.

Elevator systems require maintenance to be performed on the various components thereof, with some such components located exterior from the interior cab of the elevator car. Such components may be arranged on an exterior structure of the elevator car and/or located within an elevator shaft. To perform maintenance on such components, technicians may be required to gain access to the exterior of the elevator car. In some elevator systems, the elevator cars may be provided with a ceiling access panel or similar opening to allow for a technician to access the top of an elevator car from the inside of the elevator car. The ceiling access panels are manually operable and can be difficult to access depending on the size or dimensions of the elevator car. Accordingly, improved access to and operation of ceiling access panels of elevator cars may be advantageous.

SUMMARY

According to some embodiments, elevator cars are provided. The elevator cars include an elevator car floor, a plurality of side walls, and a ceiling defining an interior of the elevator car. A ceiling access panel is located in the ceiling. A ceiling panel access system includes a drum sheave arranged within one of the side walls, at least one locking pin arranged on a top of the elevator car, the at least one locking pin configured to releasably engage with the ceiling access panel to lock the ceiling access panel in a locked state and disengage with the ceiling access panel to cause the ceiling access panel to open into the interior of the elevator car, and at least one cable operably connecting the drum sheave to the at least one locking pin, wherein rotation of the drum sheave causes the at least one cable to wind about the drum sheave and cause retraction of the at least one locking pin from engagement with the ceiling access panel.

In addition to one or more of the features described above, or as an alternative, further embodiments of the elevator cars may include that the at least one locking pin is a first locking pin and a second locking pin, wherein the first locking pin selectively engages with a first side of the ceiling access panel and the second locking pin selectively engages with a second side of the ceiling access panel.

In addition to one or more of the features described above, or as an alternative, further embodiments of the elevator cars may include that the at least one cable is a first cable that operably connects the drum sheave to the first locking pin and a second cable that operably connects the drum sheave to the second locking pin.

In addition to one or more of the features described above, or as an alternative, further embodiments of the elevator cars may include that the first cable is fixedly connected to the drum sheave at a first sheave connection and the second cable is fixedly connected to the drum sheave at a second sheave connection.

In addition to one or more of the features described above, or as an alternative, further embodiments of the elevator cars may include at least one cable tension element arranged on the at least one cable between the drum sheave and the at least one locking pin.

In addition to one or more of the features described above, or as an alternative, further embodiments of the elevator cars may include that the drum sheave is arranged behind a car operating panel arranged on the side wall in which the drum sheave is arranged.

In addition to one or more of the features described above, or as an alternative, further embodiments of the elevator cars may include that the drum sheave comprises a keyway, and rotation of a key within the keyway causes rotation of the drum sheave and actuation of the at least one locking pin.

In addition to one or more of the features described above, or as an alternative, further embodiments of the elevator cars may include at least one guide sheave arranged to change a direction of orientation of the at least one cable at a position between the drum sheave and the at least one locking pin.

In addition to one or more of the features described above, or as an alternative, further embodiments of the elevator cars may include a working platform attached to the ceiling access panel, wherein opening of the ceiling access panel deploys the working platform.

In addition to one or more of the features described above, or as an alternative, further embodiments of the elevator cars may include a biasing element associated with the at least one locking pin and arranged to bias the at least one locking pin into a locked position.

In addition to one or more of the features described above, or as an alternative, further embodiments of the elevator cars may include that the at least one locking pin comprises an angled contact surface that is configured to be contacted by a part of the ceiling access panel to urge the at least one locking pin against a biasing force of the biasing element.

In addition to one or more of the features described above, or as an alternative, further embodiments of the elevator cars may include that the ceiling access panel comprises a panel frame and the panel frame includes a locking aperture that is arranged to align with the at least one locking pin and receive the at least one locking pin to secure the ceiling access panel in the locked state.

In addition to one or more of the features described above, or as an alternative, further embodiments of the elevator cars may include a support frame arranged on the top of the elevator car, wherein the ceiling access panel is configured to fixedly connect to the support frame when the at least one locking pin is engaged with the ceiling access panel.

In addition to one or more of the features described above, or as an alternative, further embodiments of the elevator cars may include that the ceiling access panel comprises a panel frame and the panel frame includes a locking aperture that is arranged to align with the at least one locking pin and receive the at least one locking pin to secure the ceiling access panel in the locked state.

In addition to one or more of the features described above, or as an alternative, further embodiments of the elevator cars may include that the at least one locking pin extends through the support frame and the panel frame when the at least one locking pin is engaged with the ceiling access panel.

In addition to one or more of the features described above, or as an alternative, further embodiments of the elevator cars may include a first guide sheave arranged within the same side wall as the drum sheave, wherein the first guide sheave is arranged to direct the at least one cable to turn from a horizontal orientation to a vertical orientation.

In addition to one or more of the features described above, or as an alternative, further embodiments of the elevator cars may include a second guide sheave arranged at the top of the elevator car and configured to direct the at least one cable to turn from the vertical orientation to a horizontal orientation at the top of the elevator car.

In addition to one or more of the features described above, or as an alternative, further embodiments of the elevator cars may include a first cable tension element arranged along the at least one cable between the drum sheave and the first guide sheave and a second cable tension element arranged along the at least one cable between the first guide sheave and the second guide sheave.

In addition to one or more of the features described above, or as an alternative, further embodiments of the elevator cars may include a third guide sheave arranged at the top of the elevator car and configured to direct the at least one cable to turn to axially align the at least one cable with the at least one locking pin such that as the at least one cable is wound about the drum sheave, the at least one locking pin is disengaged from the ceiling access panel.

In addition to one or more of the features described above, or as an alternative, further embodiments of the elevator cars may include a first cable tension element arranged along the at least one cable between the drum sheave and the first guide sheave, a second cable tension element arranged along the at least one cable between the first guide sheave and the second guide sheave, and a third cable tension element arranged along the at least one cable between the second guide sheave and the at least one locking pin.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
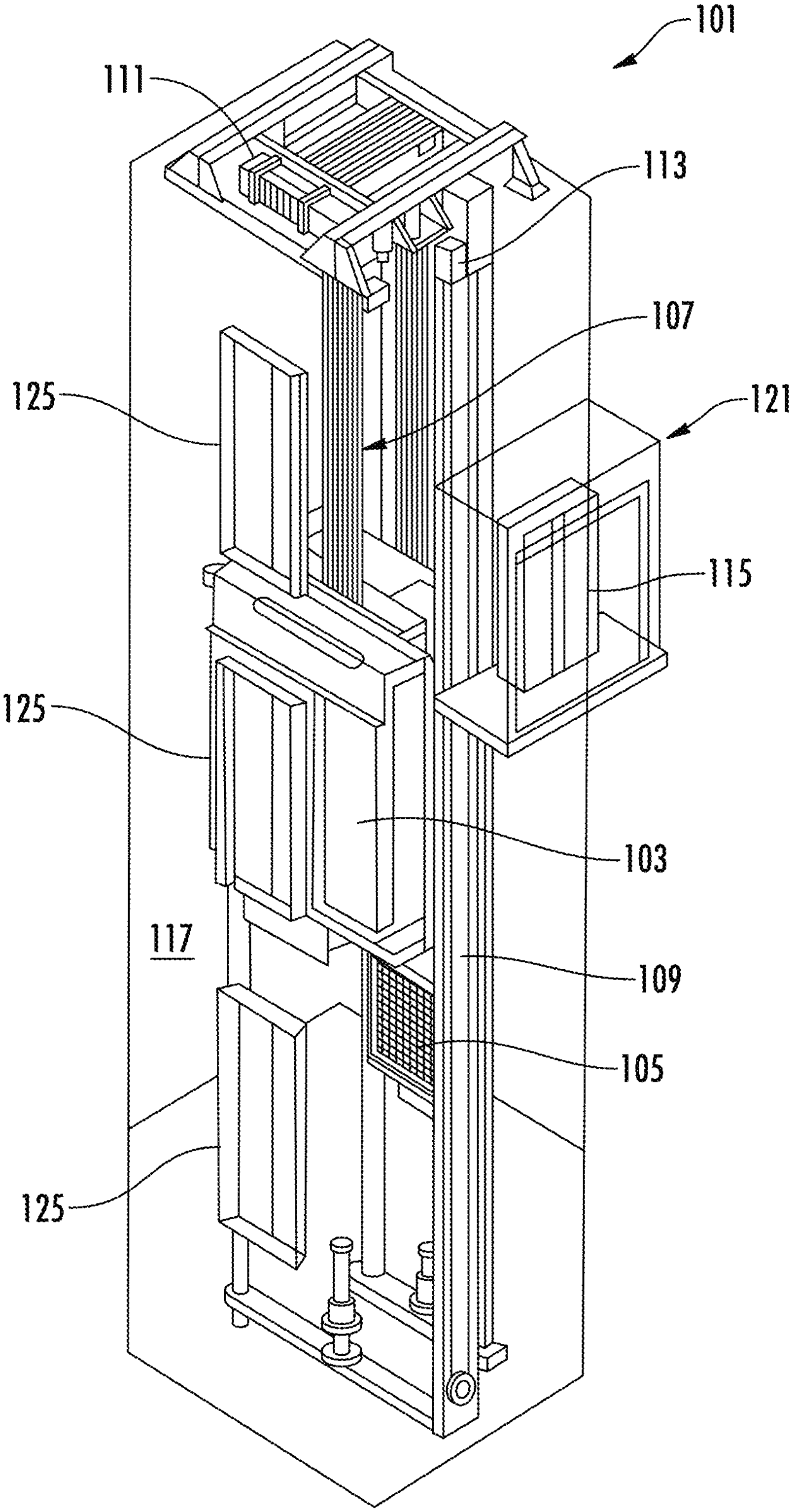
FIG. 1 is a schematic illustration of an elevator system that may employ various embodiments of the present disclosure.

FIG. 1 is a perspective view of an elevator system 101 including an elevator car 103, a counterweight 105, a roping 107, a guide rail 109, a machine 111, a position encoder 113, and an elevator controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which, in this illustrative embodiment, is part of an overhead structure of the elevator system 101, although other arrangements are possible without departing from the scope of the present disclosure. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 is located, as shown in the illustrative arrangement, in a controller room 121 of the elevator shaft 117 and is configured to control the operation of the elevator system 101, and particularly the elevator car 103. In other embodiments the controller 115 can be located in other locations, including, but not limited to, fixed to a landing or landing door or located in a cabinet at a landing. The elevator controller 115 may provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. Although shown and described with a roping system, elevator systems that employ other methods and mechanisms of moving an elevator car within an elevator shaft may employ embodiments of the present disclosure. FIG. 1 is merely a non-limiting example presented for illustrative and explanatory purposes.

Figure 2:
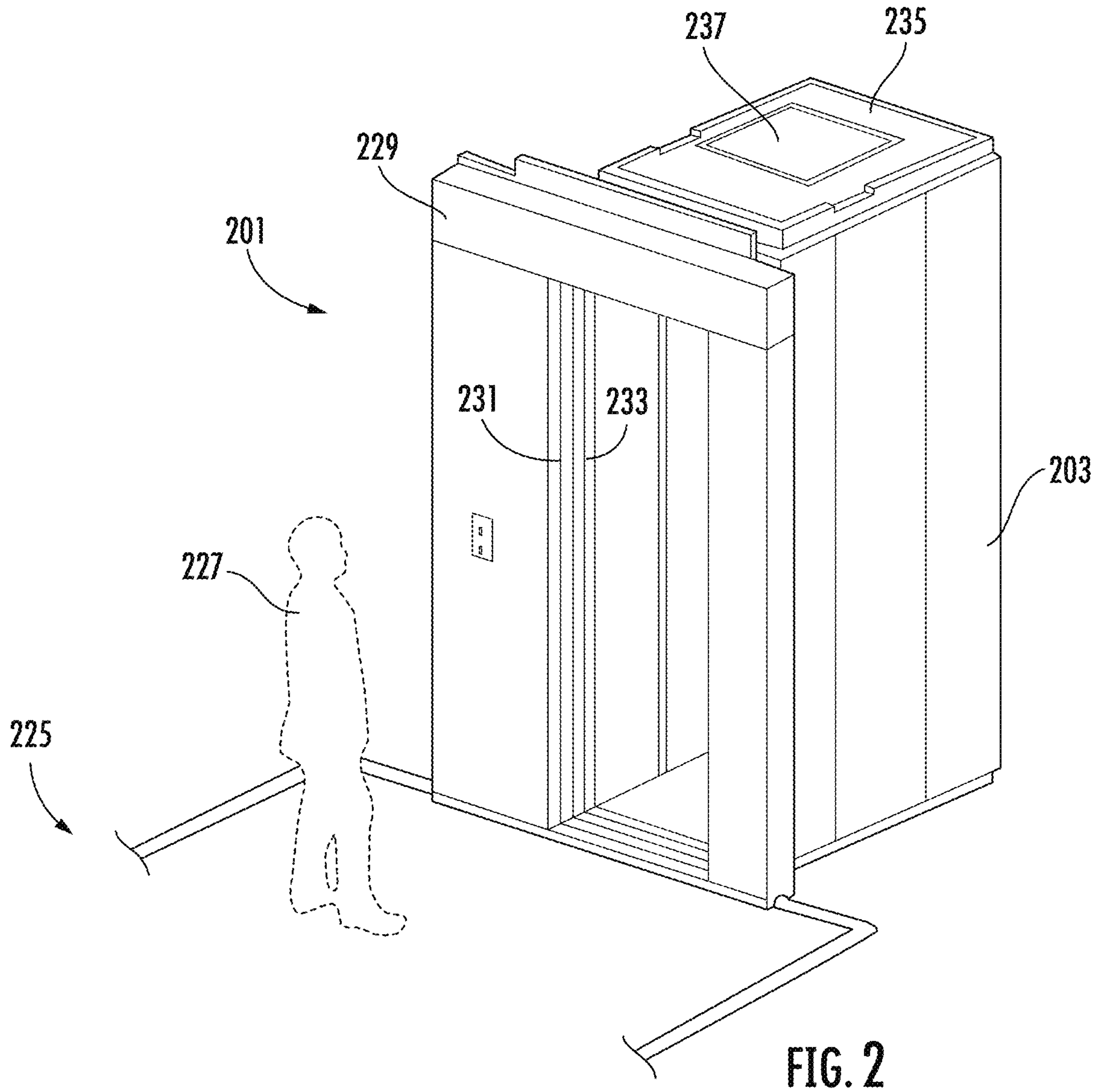
FIG. 2 is a schematic illustration of a landing door of an elevator system that may employ various embodiments of the present disclosure.

FIG. 2 is a schematic illustration of an elevator system 201 that may incorporate embodiments disclosed herein. As shown in FIG. 2, an elevator car 203 is located at a landing 225. The elevator car 203 may be called to the landing 225 by a user 227 (e.g., passenger or mechanic) that desires to travel to another floor within a building or perform maintenance on a portion of the elevator system 201. A car door lintel 229 of the elevator system 201 can include a door opening system or door operator to enable opening and closing of car doors 231 and landing doors 233 when the elevator car 203 is located at the landing 225. At times, such as during maintenance operations, a mechanic 227 may need to access an elevator car top 235 through a ceiling access panel 237.

In conventional systems, the mechanic 227 may be required to bring a step ladder and/or other equipment into the elevator car 203, in order to reach the ceiling and thus open the ceiling access panel 237. This requires additional equipment to be carried by the mechanic. Embodiments provided herein are directed to improved systems for accessing, opening, and operating ceiling access panels and providing access to an elevator car top. In some elevator configurations, the elevator cars/cabs may be limited to no greater than 2.3 m tall. For elevator cars/cabs that are taller than 2.3 m, it may be difficult for a mechanic to reach the ceiling access panel, in addition to suffering from other drawbacks, such as safety concerns or the like. In order to reduce the risks to a mechanic and to allow for relatively easy access to operation of a ceiling access panel within an elevator car, embodiments of the present disclosure are directed to a remote release mechanism to release the ceiling access panel and thus provide access to a platform or the like that may be lowered from the ceiling access panel.

Figure 3:
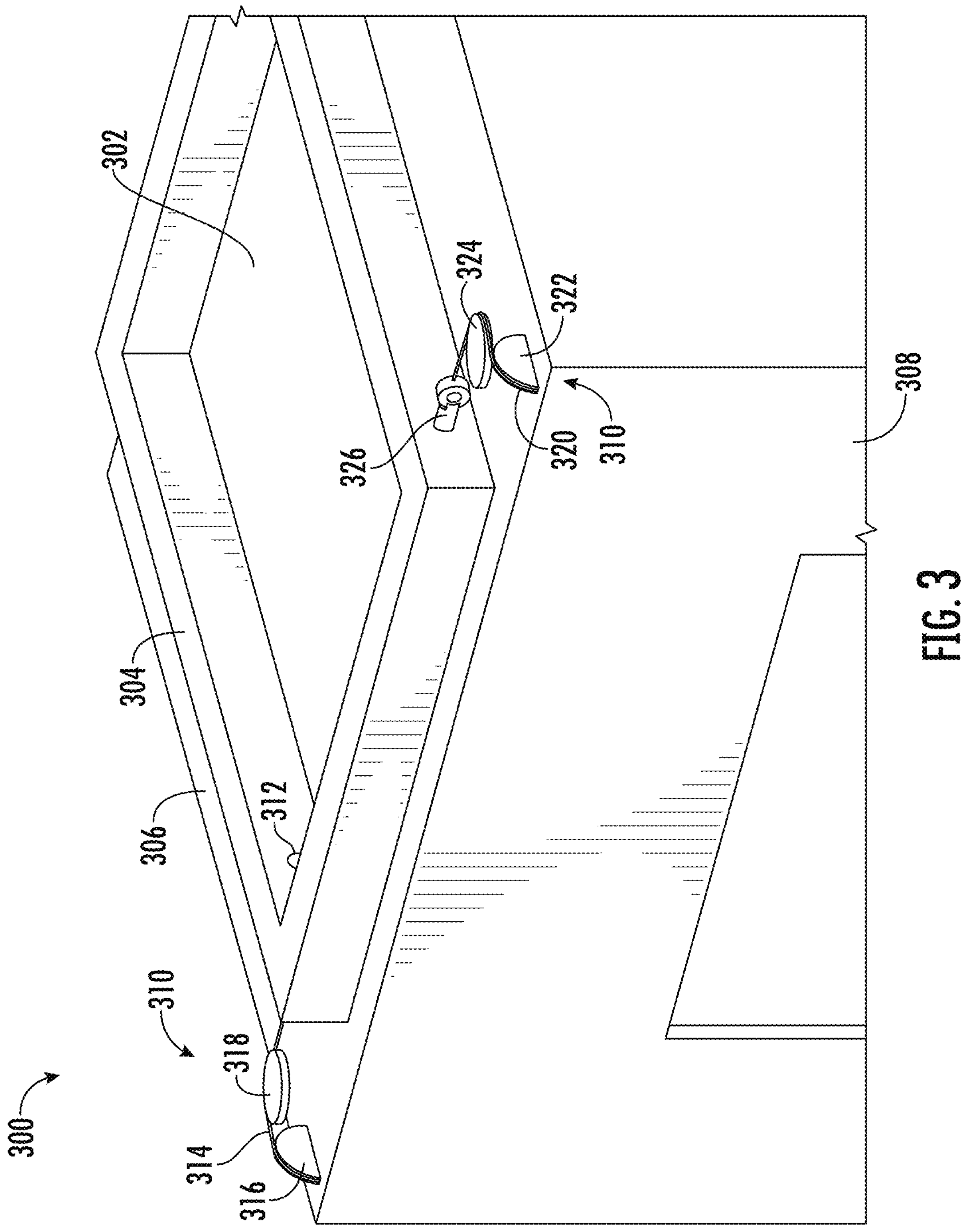
FIG. 3 is a schematic illustration of a portion of an elevator ceiling panel access system in accordance with an embodiment of the present disclosure.

Turning now to FIG. 3 a schematic illustration of a part of an elevator car 300 having a ceiling access panel 302 is illustratively shown. The ceiling access panel 302 may be hingedly or pivotally supported on a frame 304 arranged on an elevator car top 306 of an elevator car 308. The ceiling access panel 302 may be arranged in a locked position or secured position, such as shown in FIG. 3, and may be selectively operated and released from the locked position or secured position, such that a user (e.g., mechanic) can lower or open the ceiling access panel 302 to gain access to a platform or otherwise gain access through the open ceiling access panel 302 to access the elevator car top 306.

To release the ceiling access panel 302, a user (e.g., mechanic, authorized personnel, etc.) may operate a remote release assembly 310 from within the elevator car 308. The actuation operation, described herein, is configured to act upon one or more locking pins 312, 326 to release the ceiling access panel 302. For example, as shown in FIG. 3 in this non-limiting example, a first cable 314 is directed around a respective first guide sheave 316 and a respective second guide sheave 318, with the first cable 314 operably connected to a first locking pin 312. Similarly, a second cable 320 is directed around a respective first guide sheave 322 and a respective second guide sheave 324, with the second cable 320 operably connected to a second locking pin 326. In some configurations, the first and second cables 314, 320 may be part of a single, continuous length of cable that extends from the first locking pin 312, through the guide sheaves 316, 318, 322, 324, through or about an actuating element, described herein, and to the second locking pin 326.

In accordance with embodiments of the present disclosure, both locking pins 312, 326 may be operated simultaneously by actuation of a single unlocking element/operation. In such an operation, by operating the unlocking element, the cables 314, 320 are pulled upon to cause the locking pins 312, 326 to be retracted from securing the ceiling access panel 302 to the frame 304. With the ceiling access panel 302 unlocked and no longer secured by the locking pins 312, 326, the ceiling access panel 302 may open, such as by opening downward into the interior of the elevator car 308. With the ceiling access panel 302 opened, a user may access a platform or the like.

Figure 4:
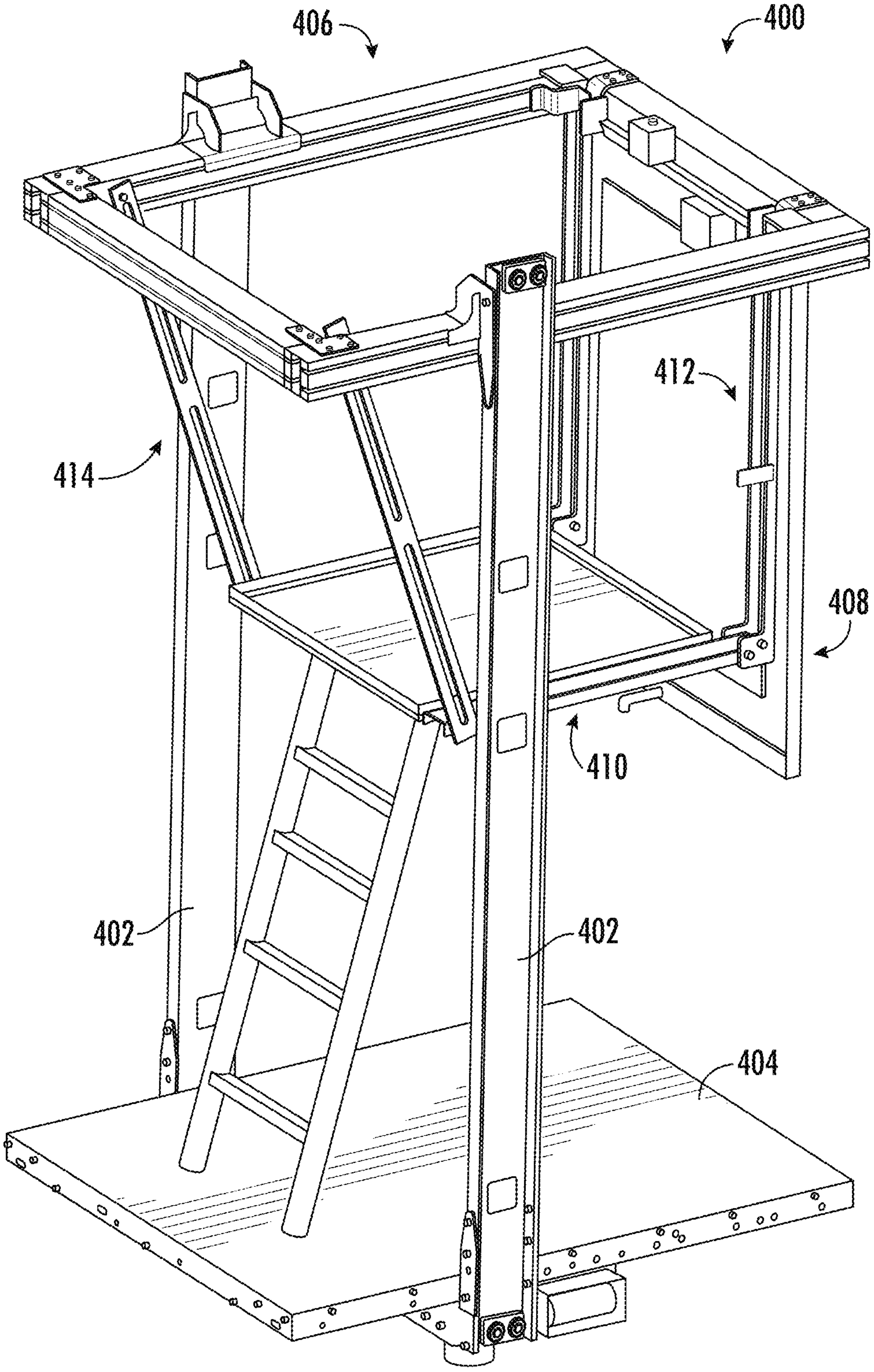
FIG. 4 is a schematic illustration of a portion of an elevator car having a ceiling panel access system in accordance with an embodiment of the present disclosure.

Referring now to FIG. 4, a schematic illustration of an elevator car 400 having a ceiling access assembly 402 in accordance with an embodiment of the present disclosure is shown. The elevator car 400 includes two structural bars 402 extending orthogonally, and vertically, from a car floor 404 of the elevator car 400. A support frame 406 is arranged at the top of the elevator car 400 and is arranged parallel to the car floor 404. The support frame 406 is mounted to upper ends of the structural bars 402 opposite to the car floor 404. It will be appreciated that although two structural bars 402 are illustrated, a frame of an elevator car may incorporate more than two such structural bars, and/or such structural bars may be arranged in other arrangements without departing from the scope of the present disclosure. In some configurations, the support frame 406, arranged at the top of the elevator car 400, may be supported by side walls of the elevator car 400 instead of or in addition to the structural bars 402.

A ceiling access assembly of the elevator car 400 includes a ceiling panel 408 that is pivotably attached to the support frame 406. The ceiling panel 408 is configured to cover and close an opening in the ceiling of the elevator car 400 when the ceiling panel 408 is in a locked or secured state (not shown). It will be appreciated that the ceiling panel 408 may support or include illumination elements (not shown), which are configured for illuminating the interior space/cab of the elevator car 400. The bottom (interior facing) side of the ceiling panel 408 may be formed as a decorative element providing a pleasant appearance of the ceiling of the interior space of the elevator car 400.

The ceiling panel 408 may be arranged to selectively engage with the support frame 406 using one or more releasable pin(s) or locking pin(s), such as shown and described above with respect to FIG. 3. Such a locking mechanism is provided by the locking pins to prevent an unauthorized movement or opening of the ceiling panel 408. The locking mechanism allows releasing of the ceiling panel 408 out of a locked position only after unlocking of the locking mechanism (e.g., by actuation or operation from a user). After the locking pin(s) have been released, the ceiling panel 408 may be pivoted from its horizontal position (e.g., forming a closed ceiling) into a vertical access position (e.g., the opening in the ceiling is exposed), in which the ceiling panel 408 extends vertically, as shown in FIG. 4.

When the ceiling panel 408 is opened, as shown in FIG. 4, a working platform 410, which is movably attached to the support frame 406, may be deployed into the interior space of the elevator car 400. The working platform 410 is attached to the support frame 406 by means of a support structure 412. The support structure 412 in this illustrative, non-limiting configuration includes two rigid bars extending parallel to each other that are pivotably attached to the working platform 410 at one end. At an opposite end, the working platform 410 is attached to the support frame 406 by means of a linkage 414. As shown in this configuration, the linkage 414 includes two linkage elements extending parallel to each other between the working platform 410 and a part of the support frame 406, which is opposite to the pivot attachment. The components of the linkage 410 may be pivotably attached to the working platform 410 and to the support frame 406 by various mechanisms as will be appreciated by those of skill in the art, and as described, for example, in U.S. Pat. No. 11,104,550, entitled "Elevator car and elevator system comprising an elevator car," granted Aug. 31, 2021, the contents of which are incorporated herein in their entirety.

In operation, after the ceiling panel 410 has been moved into an access or deployed position, as shown in FIG. 4, the working platform 410 may be moved from a retracted storage position, in which it is arranged inside and/or above the support frame 406 into the deployed working position (FIG. 4), in which the working platform 410 is positioned in a horizontal orientation within the interior space of the elevator car 400. When the working platform 410 is positioned in the deployed working position, a mechanic may position himself on the working platform 410 in order to access the top of the elevator car 400 and/or components within a hoistway or elevator shaft.

Figure 5:
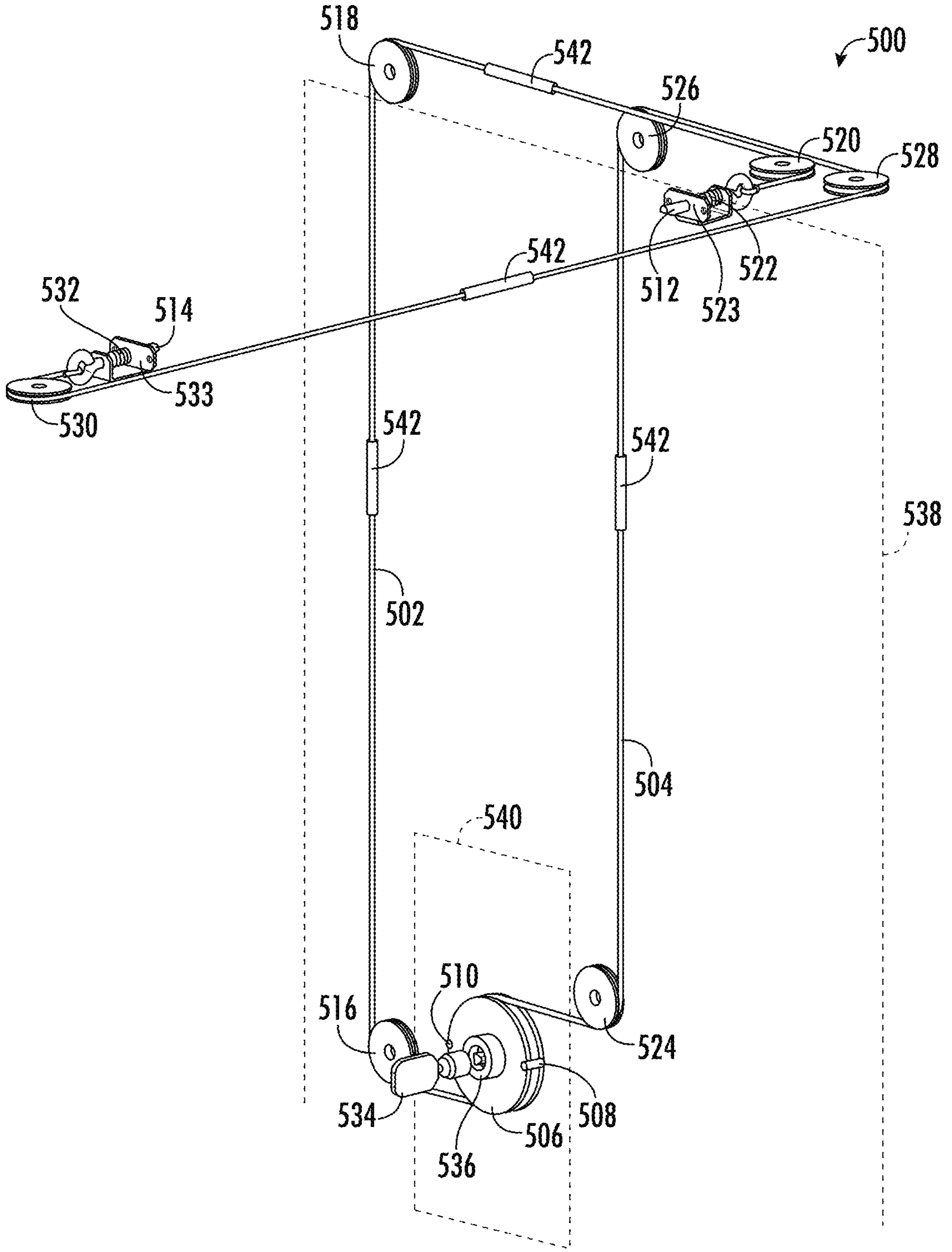
FIG. 5 is a schematic illustration of an elevator ceiling panel access system in accordance with an embodiment of the present disclosure.

Referring now to FIG. 5, a schematic illustration of a ceiling panel access system 500 in accordance with an embodiment of the present disclosure is shown. The ceiling panel access system 500 may be incorporated into an elevator car similar to that shown and described with respect to FIGS. 1-4, which includes a ceiling panel that is releasably arranged within or as part of a ceiling or top portion of an elevator car. In this non-limiting example, the ceiling panel access system 500 includes a first cable 502 and a second cable 504. Each of the first cable 502 and the second cable 504 are fixedly attached to a drum sheave 506. For example, the first cable 502 is fixedly attached to the drum sheave 506 at a first sheave connection 508. Similarly, the second cable 504 is fixedly attached to the drum sheave 506 at a second sheave connection 510. The first cable 502 operably connects the drum sheave 506 to a first locking pin 512 and the second cable 504 operably connects the drum sheave 506 to a second locking pin 514. During operation, as the drum sheave 506 is rotated, the drum sheave 506 will cause the cables 502, 504 to be wound about the drum sheave 506, thus pulling on the cables 502, 504. As the cables 502, 504 are wound about the drum sheave 506, they will apply a force on the respective locking pins 512, 514 to pull the locking pins 512, 514 out of engagement with a ceiling panel or the like, as shown and described herein.

The first cable 502 fixedly attaches to the drum sheave 506 at the first sheave connection 508. The first cable 502 then extends around a set of guide sheaves that direct the first cable 502 to the first locking pin 512. For example, in this non-limiting configuration, the first cable 502 extends horizontally from the drum sheave 506 to a first guide sheave 516, which directs the orientation of the first cable 502 into a vertical orientation. The first cable 502 will then extend vertically from the first guide sheave 516 to a second guide sheave 518, which may be arranged at or in the top/ceiling of an elevator car. The first cable 502 is then oriented horizontally to extend to a third guide sheave 520 which orients the first cable 502 with an axial translational direction of the first locking pin 512. As such, when the drum sheave 506 is rotated, the first cable 502 will be shortened as it winds about the drum sheave 506. This shortening of the first cable 502 causes a pulling force on the first locking pin 512. The first locking pin 512 may be biased into a locking state by a first biasing element 522 which is supported about the first locking pin 512 within a first bracket 523. The first bracket 523 may be fixedly mounted to the top of the elevator car, to a frame at the top of the elevator car, or the like. The pulling force applied by the first cable 502 to the first locking pin 512 is selected to overcome the biasing force of the first biasing element 522, and thus urge the first locking pin 512 out of engagement with a frame or other feature of a ceiling panel or ceiling panel assembly.

The first cable 504 fixedly attaches to the drum sheave 506 at the second sheave connection 510. The second cable 504 then extends around a set of guide sheaves that direct the second cable 504 to the second locking pin 514. For example, in this non-limiting configuration, the second cable 504 extends horizontally from the drum sheave 506 to a first guide sheave 524, which directs the orientation of the second cable 504 into a vertical orientation. The second cable 504 will then extend vertically from the first guide sheave 524 to a second guide sheave 526, which may be arranged at or in the top/ceiling of an elevator car. The second cable 504 is then oriented horizontally to extend to a third guide sheave 528 and then a fourth cable 530 which orients the second cable 504 with an axial translational direction of the second locking pin 514. As such, when the drum sheave 506 is rotated, the second cable 502 will be shortened as it winds about the drum sheave 506. This shortening of the second cable 504 causes a pulling force on the second locking pin 514. The second locking pin 514 may be biased into a locking state by a second biasing element 532 which is supported about the second locking pin 514 within a second bracket 533. The second bracket 533 may be fixedly mounted to the top of the elevator car, to a frame at the top of the elevator car, or the like. The pulling force applied by the second cable 504 to the second locking pin 514 is selected to overcome the biasing force of the second biasing element 532, and thus urge the second locking pin 514 out of engagement with a frame or other feature of a ceiling panel or ceiling panel assembly.

The drum sheave 506 may be manually operated by insertion and then actuation or turning of a key 534. The key 534 may be a triangular key or the like, as will be appreciated by those of skill in the art. The drum sheave 506 includes a keyway 536 that is arranged to receive the key 534 and enable manual rotation or turning of the drum sheave 506. FIG. 5 illustrates the ceiling panel access system 500 in isolation, separate from an elevator car. However, it will be appreciated that the cables 502, 504, the drum sheave 506, and at least some of the guide sheaves (e.g., guide sheaves 516, 524) may be arranged within or between wall panels of an elevator car such that these components are not freely accessible to a person within the elevator car. The keyway 536 may represent the visible and accessible part of the ceiling panel access system 500 within a cab or interior of the elevator car. The other guide sheaves (e.g., guide sheaves 518, 520, 526, 528, 530), the brackets 523, 533, the biasing elements 522, 532, and the locking pins 512, 514 may be arranged on an exterior or top surface of the elevator car, and may be accessible from the top of the elevator car (i.e., through an access opening). The keyway 536 may be located on a car operating panel or may be located at any appropriate position within the elevator car. The position of the keyway 536 within the interior of the elevator car may be selected for ease of access, to minimize the length of the cables 502, 504, for consideration of the number of guide sheaves required within the system, or based on other considerations, as will be appreciated by those of skill in the art.

As shown in FIG. 5, a car wall panel 538 and a car operating panel 540 are shown in dashed lines. The keyway 536 may be positioned on the car operating panel 540 and exposed/accessible from an interior of the elevator car. As noted above, the bulk of the components of the ceiling panel access system 500 may be positioned behind the car wall panel 538, thus preventing unauthorized access to these components. In some embodiments, rather than locating the keyway 536 on the car operating panel 540, the keyway 536 may be arranged at any other appropriate or desired position on the car wall panel 538. In still further embodiments, the keyway 536 may be arranged behind a door or keyway access panel (not shown), which may be provided for aesthetic purposes, safety/access purposes, or the like.

Furthermore, in some embodiments, the keyway 536 may be replaced by a handle or the like. For example, a deployable handle may be operably connected to the drum sheave 506 with the handle hidden behind a panel or the like within the elevator cab. Such a panel may be locked using a triangular key lock or the like, as will be appreciated by those of skill in the art. With the panel removed, a user can operate the handle to manually rotate the drum sheave 506. Accordingly, it will be appreciated that rotation of the drum sheave is not required to be caused by a key, but a handle or other similar manual elements may be used without departing from the scope of the present disclosure.

In this illustrative configuration, the first cable 502 and the second cable 504 are separate and distinct lengths of cable that attach at one end of the respective cable to the drum sheave 506 (at the respective sheave connections 508, 510) and at an opposite end to the respective locking pins 512, 514. In other embodiments, a single continuous cable may be wound about the drum sheave 508 and then extend in both directions to connect to each of the two locking pins 512, 514. In such a configuration, the orientation and operation of the guide sheaves may be set to ensure that a single direction of rotation of the drum sheave 506 causes both directions of cable to wrap/wind about the drum sheave 506 and thus result in the same axial force applied to both locking pins 512, 514 simultaneously. Further, in some configurations, a single portion of cable may be attached to the drum sheave, and two separate splits of cable may then extend from the single portion of cable to the respective locking pins (e.g., a Y-shaped or T-shaped cable configuration). In such embodiments, a single direction of rotation of the drum sheave will cause actuation of both locking pins simultaneously.

In some embodiments, optional cable tension elements 542 may be provided along the lengths of cables 502, 504. In some embodiments, a single cable tension element 542 may be arranged at a location along the length of the respective cable between the drum sheave 508 and the respective locking pin 512, 514. In some embodiments, such as shown, multiple cable tension elements 542 may be provided along the length of each cable 502, 504. The cable tension elements 542 may be provided to enable adjustment of tension of the respective cables 502, 504. In some embodiments, a cable tension element 542 may be arranged between each pair of sheaves along the length of the respective cable 502, 204. For example, with respect to the first cable 502, a first cable tension element may be arranged along the first cable 502 between the drum sheave 506 and the first guide sheave 516, a second cable tension element may be arranged along the first cable 502 between the first guide sheave 516 and the second guide sheave 518, and a third cable tension element may be arranged along the first cable 502 between the second guide sheave 518 and the third guide sheave 520. Optionally, depending on the length of cable between the third guide sheave 520 and the first locking pin 512, an additional cable tension element may be provided. A similar set of cable tension elements may be provided along the second cable 504. The cable tension elements may be turnbuckles or other cable tensioning devices.

Figure 6:
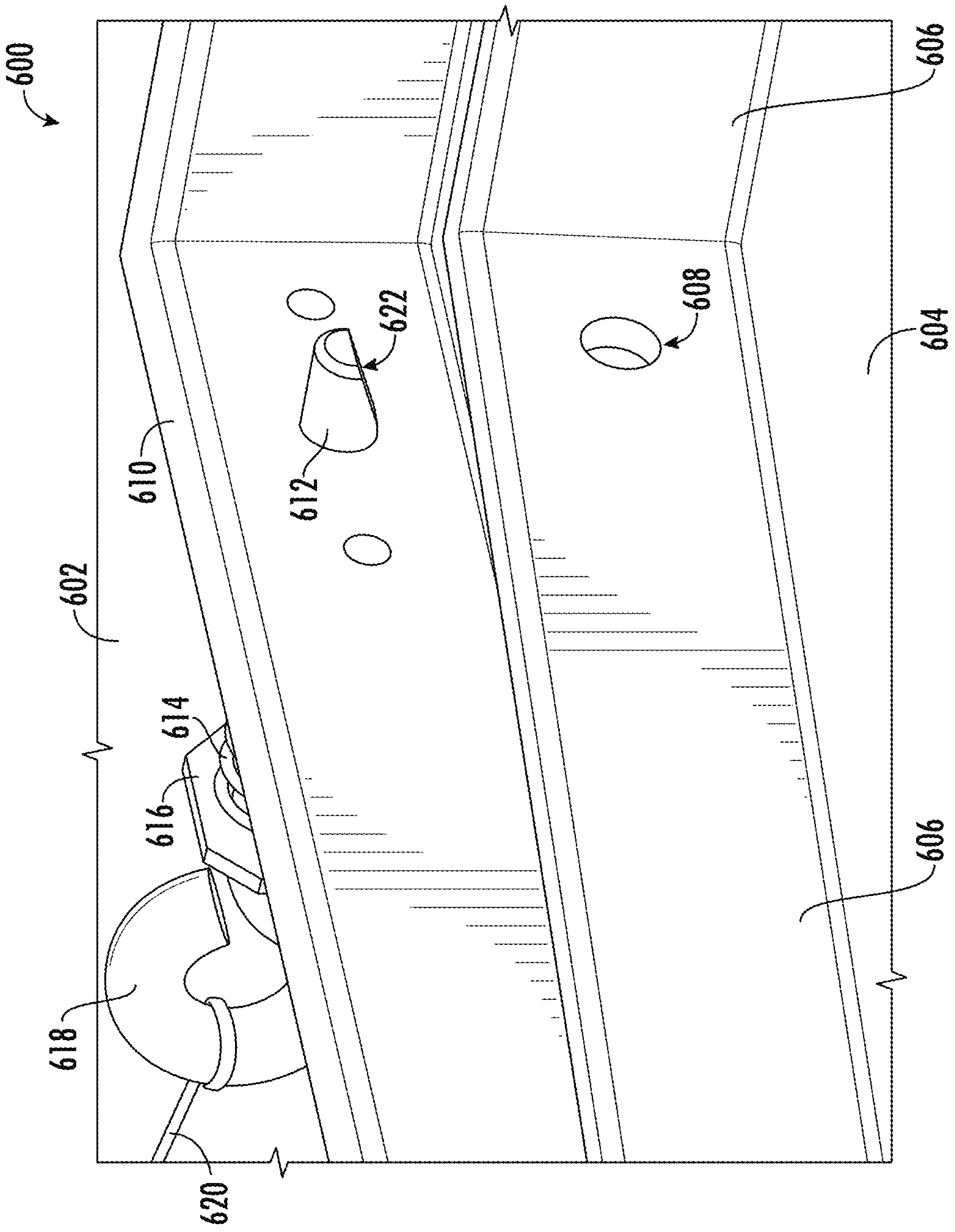
FIG. 6 is a schematic illustration of a portion of an elevator ceiling panel access system in accordance with an embodiment of the present disclosure.

Referring now to FIG. 6, a schematic illustration of a ceiling panel access system 600 in accordance with an embodiment of the present disclosure is shown. The ceiling panel access system 600 may be configurated similar to that shown in FIG. 5, including a sheave system for permitting manual rotation of a key within the elevator car to cause actuation and operation of a ceiling panel, similar to that shown and described above. As shown in FIG. 6, an elevator car includes an elevator car top 602. A ceiling access panel 604 is provided at the elevator car top 602 which is selectively openable to permit access from an interior of the elevator car through an opening that may be exposed when the ceiling access panel 604 is moved during operation of the ceiling panel access system 600.

As shown, the ceiling access panel 604 includes a panel frame 606 that provides structure to the ceiling access panel 604. The panel frame 606 includes a locking aperture 608 which is a hole formed in the panel frame 606. It will be appreciated that a second locking aperture may be provided directly opposite the illustrated locking aperture 608 such that opposite sides of the panel frame 606 may be engaged with respective locking pins. In this illustrative configuration, a support frame 610 is provided on the elevator car top 602, similar to that shown and described above. The support frame 610 is arranged to receive a part of a locking pin 612 which passes through an aperture of the support frame 610. Although shown with the ceiling access panel 604 separated from the support frame 610 (i.e., a partially open state), it will be appreciated that in a closed state, the locking aperture 608 of the panel frame 606 aligns with the aperture of the support frame 610 such that the locking pin 612 can engage with the locking aperture 608 of the panel frame 606.

The locking pin 612 may be biased into an extended position, which is shown in FIG. 6. The biasing of the locking pin 612 is provided by a biasing element 614 that is arranged about or as part of the locking pin 612. In this illustrative configuration, the biasing element 614 is arranged as a spring with a portion of the locking pin 612 extending through the spring. The biasing element 614 is arranged to biasing against a biasing surface that is part of a bracket 616, similar to that shown and described with respect to FIG. 5. The bracket 616 may be fixedly attached or mounted to the elevator car top 602 and/or the support frame 610. The locking pin 612 includes a cable connector 618 that connects to a cable 620. The cable 620, in turn, connects to an actuator or the like, such as a drum sheave, similar to that shown and described above. When the cable 620 applies a force to the locking pin 612, the locking pin 612 will be urged in a direction away from the ceiling access panel 604. As this happens, the biasing element 614 will be compressed. The locking pin 612 may thus be pulled out of engagement with the locking aperture 608 in the panel frame 606. When the locking 612 is retracted from the locking aperture 608, the ceiling access panel 604 may be released and fall downward, thus providing access to the ceiling access panel 604 and any associated elements (e.g., a working platform or the like).

After the ceiling access panel 604 is released, the biasing element 614 may urge the locking pin 612 to extend through the aperture in the support frame 610. This will expose a tip of the locking pin 612. The locking pin 612 includes a contact surface 622. The contact surface 622 of the locking pin 612 is an angled or inclined surface of the end of the locking pin 612. When the ceiling access panel 604 is moved back into a secured position (e.g., when a maintenance activity is complete), a top of the panel frame 606 will contact the contact surface 622 and urge the locking pin 612 against the biasing force of the biasing element 614 and cause the locking pin 612 to retract, thus permitting the ceiling access panel 604 to be moved into a locked position. As the panel frame 606 travels over the end of the locking pin 612 during this closing operation, the locking aperture 608 will align with the locking pin 612. The locking pin 612 will then be biased to pass into the locking aperture 608 to secure the panel frame 606 to the support frame 610.

In accordance with embodiments of the present disclosure, systems and mechanisms for operating an elevator ceiling access panel and gaining access to a top of an elevator car are provided. The ceiling panel access systems described herein provide for a means to release and access a ceiling panel and/or working platform. Advantageously, embodiments of the present disclosure provide for a remote operation and release mechanism to open a ceiling access panel, without requiring additional materials or tools for access thereto. Such configurations may be useful in relatively tall elevator cars, having heights of over 2.3 m (e.g., up to 3.5 m or greater). The remote operation enables a user to gain access to the ceiling panel without requiring climbing within the elevator car to release the panel.

For example, advantageously, in accordance with some embodiments, a remote actuator, such as a keyway and drum sheave may be manually operated from within the elevator car, and at a comfortable position to the user (e.g., on a car operating panel). When the user rotates a key in the keyway, the drum sheave will be rotated, causing the cables of the ceiling panel access system to wind about the drum sheave and thus apply a pulling force on locking pins arranged at opposite ends of cables. The pulling force will cause the locking pins to disengage from securing the ceiling panel in place, and thus release the ceiling panel for access by the user. Because the locking pins are biased into the locked or extended state, when the ceiling panel is moved back into a closed position, the locking pins will automatically reengage with the ceiling panel to secure it in place.

In accordance with a non-limiting embodiment of the present disclosure, a pair of cables are terminated at a top of an elevator car to two spring-loaded latch pins or locking pins. Two or more guide sheaves/pullies are provided to guide and change the cable direction and orientation, to ensure appropriate directional application of forces. An actuation handle or mechanism is hidden in the cab, such as behind a car operating panel and/or car wall panel. In operation, actuating the cable by rotation of the drum sheave will cause retraction of spring-loaded latch pins or locking pins. Such a retraction will release the ceiling panel and/or a work platform to drop down into the elevator cab. Accordingly, embodiments of the present disclosure provide for improved access to ceiling panels and/or working platforms to allow for access to a top of an elevator car from the interior thereof.

As used herein, the use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity).

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator car comprising:

an elevator car floor, a plurality of side walls, and a ceiling defining an interior of the elevator car;

a ceiling access panel located in the ceiling; and a ceiling panel access system comprising:

a drum sheave arranged within one of the side walls;

at least one locking pin arranged on a top of the elevator car, the at least one locking pin configured to releasably engage with the ceiling access panel to lock the ceiling access panel in a locked state and disengage with the ceiling access panel to cause the ceiling access panel to open into the interior of the elevator car; and at least one cable operably connecting the drum sheave to the at least one locking pin, wherein rotation of the drum sheave causes the at least one cable to wind about the drum sheave and cause retraction of the at least one locking pin from engagement with the ceiling access panel.

2. The elevator car of claim 1, wherein the at least one locking pin is a first locking pin and a second locking pin, wherein the first locking pin selectively engages with a first side of the ceiling access panel and the second locking pin selectively engages with a second side of the ceiling access panel.

3. The elevator car of claim 2, wherein the at least one cable is a first cable that operably connects the drum sheave to the first locking pin and a second cable that operably connects the drum sheave to the second locking pin.

4. The elevator car of claim 3, wherein the first cable is fixedly connected to the drum sheave at a first sheave connection and the second cable is fixedly connected to the drum sheave at a second sheave connection.

5. The elevator car of claim 1, further comprising:

at least one cable tension element arranged on the at least one cable between the drum sheave and the at least one locking pin.

6. The elevator car of claim 1, wherein the drum sheave is arranged behind a car operating panel arranged on the side wall in which the drum sheave is arranged.

7. The elevator car of claim 1, wherein the drum sheave comprises a keyway, and rotation of a key within the keyway causes rotation of the drum sheave and actuation of the at least one locking pin.

8. The elevator car of claim 1, further comprising:

at least one guide sheave arranged to change a direction of orientation of the at least one cable at a position between the drum sheave and the at least one locking pin.

9. The elevator car of claim 1, further comprising:

a working platform attached to the ceiling access panel, wherein opening of the ceiling access panel deploys the working platform.

10. The elevator car of claim 1, further comprising;

a biasing element associated with the at least one locking pin and arranged to bias the at least one locking pin into a locked position.

11. The elevator car of claim 10, wherein the at least one locking pin comprises an angled contact surface that is configured to be contacted by a part of the ceiling access panel to urge the at least one locking pin against a biasing force of the biasing element.

12. The elevator car of claim 10, wherein the ceiling access panel comprises a panel frame and the panel frame includes a locking aperture that is arranged to align with the at least one locking pin and receive the at least one locking pin to secure the ceiling access panel in the locked state.

13. The elevator car of claim 1, further comprising:
a support frame arranged on the top of the elevator car, wherein the ceiling access panel is configured to fixedly connect to the support frame when the at least one locking pin is engaged with the ceiling access panel.

14. The elevator car of claim 13, wherein the ceiling access panel comprises a panel frame and the panel frame includes a locking aperture that is arranged to align with the at least one locking pin and receive the at least one locking pin to secure the ceiling access panel in the locked state.

15. The elevator car of claim 14, wherein the at least one locking pin extends through the support frame and the panel frame when the at least one locking pin is engaged with the ceiling access panel.

16. The elevator car of claim 1, further comprising:
a first guide sheave arranged within the same side wall as the drum sheave, wherein the first guide sheave is arranged to direct the at least one cable to turn from a horizontal orientation to a vertical orientation.

17. The elevator car of claim 16, further comprising:
a second guide sheave arranged at the top of the elevator car and configured to direct the at least one cable to turn from the vertical orientation to a horizontal orientation at the top of the elevator car.

18. The elevator car of claim 17, further comprising:
a first cable tension element arranged along the at least one cable between the drum sheave and the first guide sheave; and
a second cable tension element arranged along the at least one cable between the first guide sheave and the second guide sheave.

19. The elevator car of claim 17, further comprising:
a third guide sheave arranged at the top of the elevator car and configured to direct the at least one cable to turn to axially align the at least one cable with the at least one locking pin such that as the at least one cable is wound about the drum sheave, the at least one locking pin is disengaged from the ceiling access panel.

20. The elevator car of claim 19, further comprising:
a first cable tension element arranged along the at least one cable between the drum sheave and the first guide sheave;
a second cable tension element arranged along the at least one cable between the first guide sheave and the second guide sheave; and
a third cable tension element arranged along the at least one cable between the second guide sheave and the at least one locking pin.

* * * * *